United States Patent
Whitmore (12)

(10) Patent No.: US 6,219,932 B1
(45) Date of Patent: Apr. 24, 2001

(54) CLIP-ON MICROMETER TABLE

(76) Inventor: Robert C. Whitmore, 884 Greenway Rd., Woodbridge, CT (US) 06525

(*) Notice: Subject to any disclaimer, the term of this patent is extended or adjusted under 35 U.S.C. 154(b) by 0 days.

(21) Appl. No.: 09/300,233

(22) Filed: Apr. 27, 1999

(51) Int. Cl.[7] ............................................... G01B 3/18
(52) U.S. Cl. ................................................ 33/831; 33/549
(58) Field of Search ........................... 33/549, 813, 828, 33/829, 831

(56) References Cited

U.S. PATENT DOCUMENTS

| | | | |
|---|---|---|---|
| 694,804 | * 3/1902 | Stromberg | 33/828 |
| 1,269,756 | * 6/1918 | Slocomb | 33/828 |
| 1,956,871 | * 5/1934 | Mayman | 33/828 |
| 2,401,951 | * 6/1946 | Martinec | 33/829 |
| 2,692,438 | * 10/1954 | Schneider | 33/829 |
| 2,835,040 | * 5/1958 | D'Elia | 33/813 |
| 2,861,346 | * 11/1958 | Patterson | 33/828 |
| 2,912,764 | * 11/1959 | Spurr | 33/828 |
| 3,166,850 | * 1/1965 | Yamazawa | 33/831 |
| 3,769,712 | * 11/1973 | Hong | 33/813 |
| 5,287,631 | 2/1994 | Stade | 33/823 |
| 5,345,692 | 9/1994 | Babitchenko | 33/828 |
| 5,383,286 | * 1/1995 | Kipnes | 33/829 |
| 5,463,818 | 11/1995 | Hughes | 33/813 |
| 6,021,580 | * 2/2000 | Mangredotti et al. | 33/712 |

* cited by examiner

*Primary Examiner*—G. Bradley Bennett

(57) ABSTRACT

An accessory for aligning items parallel to the measurement axis of an outside micrometer, comprising:
- a platform, having a flat surface bisected by a depressed channel, the platform including a first cylindrical ring disposed at one end of the channel, the platform also including a keyed cavity beneath the channel,
- a second cylindrical ring, connected to a keyed rod, the rod being slidably installed into the keyed cavity, whereby the first and second cylindrical rings are maintained coaxial and parallel to the platform surface and the keyed channel,
- a spring, retained in the keyed cavity by the keyed rod, exerting outward force on the rod and attached ring, maintaining them in a slidably extended position, limited by protruding wedges in the keyed cavity.

6 Claims, 4 Drawing Sheets

CLIP-ON MICROMETER TABLE

CROSS-REFERENCE TO RELATED APPLICATIONS

Not applicable.

BACKGROUND

1. Field of Invention

This invention relates to accessories for a micrometer, specifically to those accessories which are attachable to, and detachable from a conventional outside micrometer.

2. Description of Prior Art

Attachments for a conventional outside micrometer are commonly used in the manufacturing and machining industries. The general function of these attachments is to facilitate accurate measurement taking of specific part or material shapes.

There are two types known to this inventor. Both types modify the interface between the micrometer and the item being measured. The first type mounts directly over the micrometer spindle or anvil measuring faces and is commonly retained to them by a rubber attachment boot or sleeve apparatus. These are commonly known as anvil and spindle attachments. As found, all of these attachments add a length to the anvil or spindle, which must be subtracted from the measurement. None have been found to create a platform, surface, or "table" to support or align the measured item.

The second type consists of specialty micrometers which employ interchangeable spindles or anvils of various configuration. None of them have been found to create a table to support or align the measured item. Micrometer stands might be considered add-on accessories, however they support the micrometer itself, and again do not support or align the measured item.

There are only two micrometer-type measuring tools known to this inventor which do support or align the measured item. One is known as a "wire micrometer". It is a specialty micrometer, not an add-on accessory for a conventional micrometer. The table of a wire micrometer is a non-removable part of the micrometer itself. The table configuration greatly reduces the clearance to measure most common items. There is no clearance loop, or "throat" between the spindle and the anvil, as there is on a conventional micrometer. The inability to measure most common items, and the prohibitive expense of this specialty tool, tends to limit sales to specific industries such as the wire forming industry.

In addition, wire micrometers are not easily held and utilized in one hand. The throat loop of a conventional micrometer is normally grasped between the tip of the pinky finger and the palm of the hand. This allows the micrometer to be positively retained, while the measuring adjustment (barrel rotation) is accomplished with the thumb and index finger. Therefore, the normal operation of a conventional micrometer is one-handed, allowing the other hand to hold the item being measured. Although a wire micrometer may be held in one hand, there is no throat loop to be grasped, thus it may easily be dropped. Another disadvantage of the wire micrometer table is that it is narrow, generally about 13 mm. wide. It is difficult to stabilize many measured items on this small surface area. The normal measuring range is only zero to 13 mm. or less, compared to the conventional micrometer measuring range of zero to 25.4 mm. The table is also not free to rotate about the measurement axis. To measure a stationary item, the wire micrometer itself must be positioned so that the "table" rests flat against the item. This often requires the scale or digital readout to be facing at an angle away from the operator.

The other type of micrometer found to incorporate a table surface on which the measured item may be supported is known as a bench micrometer. A bench micrometer has an integral heavy base. It is not a hand held tool. It is designed to rest stationary on a workbench, therefore the object to be measured is brought to it. The table surface of a bench micrometer is an integral part of the tool, not an attachment. Also as found, the table surface does not have rotational self-aligning capability.

U.S. Pat. No. 5,463,818 to Hughes (1994), and U.S. Pat. No. 5,287,631 to Stade (1991), disclose micrometer-type measuring tools with tables on which to rest the measured item. However, they are also bench type micrometers, not attachments to a conventional micrometer.

SUMMARY

The object of the present invention is to aid in the alignment of certain items between the measuring faces of a conventional micrometer. The object is also for the present invention to be quickly and easily attached to, and removed from the micrometer.

Objects and Advantages

Accordingly, several objects and advantages of the preferred embodiment of the present invention are:

(a) to create a table surface aligned parallel to the measurement axis of a conventional micrometer on which to position an item between the measuring faces of the micrometer.

(b) to attach to a micrometer by radial capture of the anvil and spindle. This allows the table surface of the present invention to rotate axially around the measurement axis, yielding axial self-alignment capability to items in a fixed position.

(c) to not affect or alter the interface between the micrometer measuring faces and the measured item. There is no add-on item whose length must be subtracted from the measurement.

(d) to provide an attachment mechanism allowing rapid installation and removal from the micrometer without reducing the measurement range.

(e) to not affect the portability or normal one-handed operation of a conventional micrometer.

(f) to provide a table surface of adequate width and length to properly support flat, thin profile items within the entire micrometer measurement range.

(g) to provide a depressed V-groove in the table surface so as to align and support cylindrical items parallel to the measurement axis.

(h) to be manufactured of molded plastic, of a durometer softer than the micrometer measuring faces and body, so as to eliminate the possibility of damage to them.

Further objects and advantages of the present invention will become apparent from a consideration of the drawings and ensuing description.

DRAWING FIGURES

For a fuller understanding of the nature and objects of the present invention, reference should be had to the following detailed description taken in connection with the accompanying drawings in which:

FIGS. 1–5)

| | |
|---|---|
| 20 Clip-on Micrometer Table | 22 platform |
| 24 spindle clip | 26 anvil mount ring |
| 28 spindle mount ring | 30 table surface-left side |
| 32 table surface-right side | 34 spring |
| 36 interface cavity | 38 platform-front surface |
| 40 interface cavity-bottom surface | 42 slot side-wall surface-left side |
| 44 slot side-wall surface-right side | 46 interface slot |
| 48 V-channel surface-left side | 50 V-channel surface-right side |
| 52 upper slot end surface | 54 lower slot end surface |
| 56 snap-retention feature-left side | 58 snap-retention feature-right side |
| 64 locking tab | 66 rod end surface-back |
| 68 rod surface-front | 70 platform surface-back |

Figure 6:
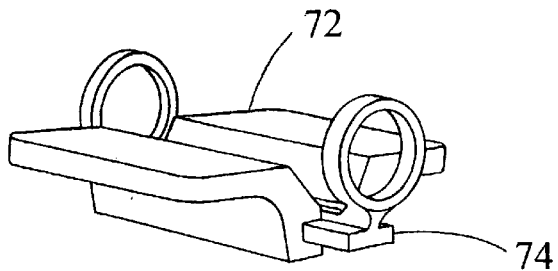
FIG. 6 is a perspective view of an alternate embodiment of the present invention with a rectangular interface configuration.
Figure 7:
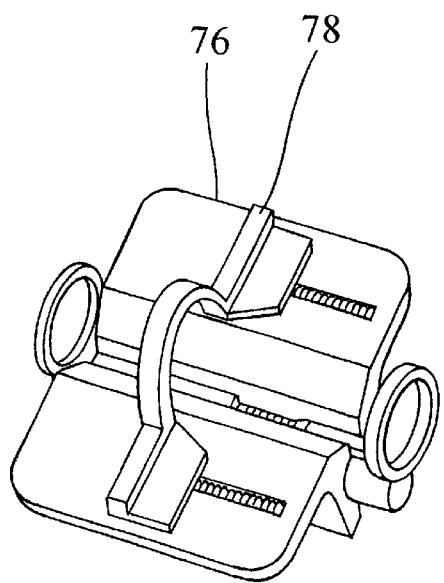
FIG. 7 is a perspective view of an alternate configuration of the present invention further including a fence integrated to the table surface.
Figure 8:
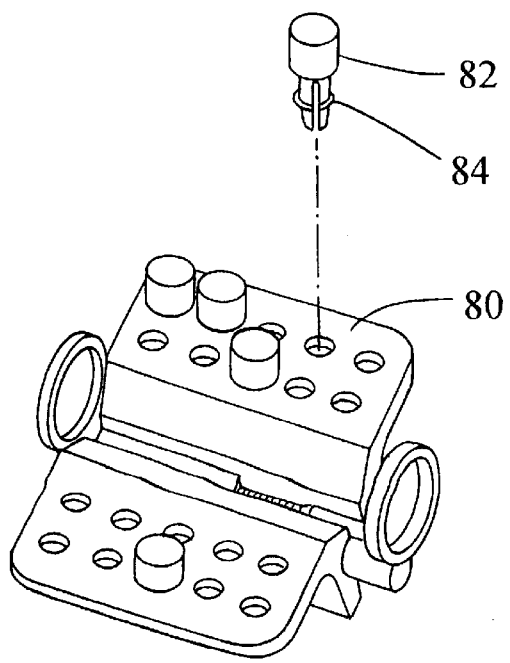
FIG. 8 is a perspective view of an alternate configuration of the present invention further including pegs attachable to the table surface.

(Alternate Embodiments: FIGS. 6–8)

| | |
|---|---|
| 72 rectangular interface platform | 74 rectangular interface spindle clip |
| 76 fenced platform | 78 spring tensioned fence |
| 80 perforated table surface | 82 peg(s) |
| 84 peg snap retention feature | |

Figure 9:
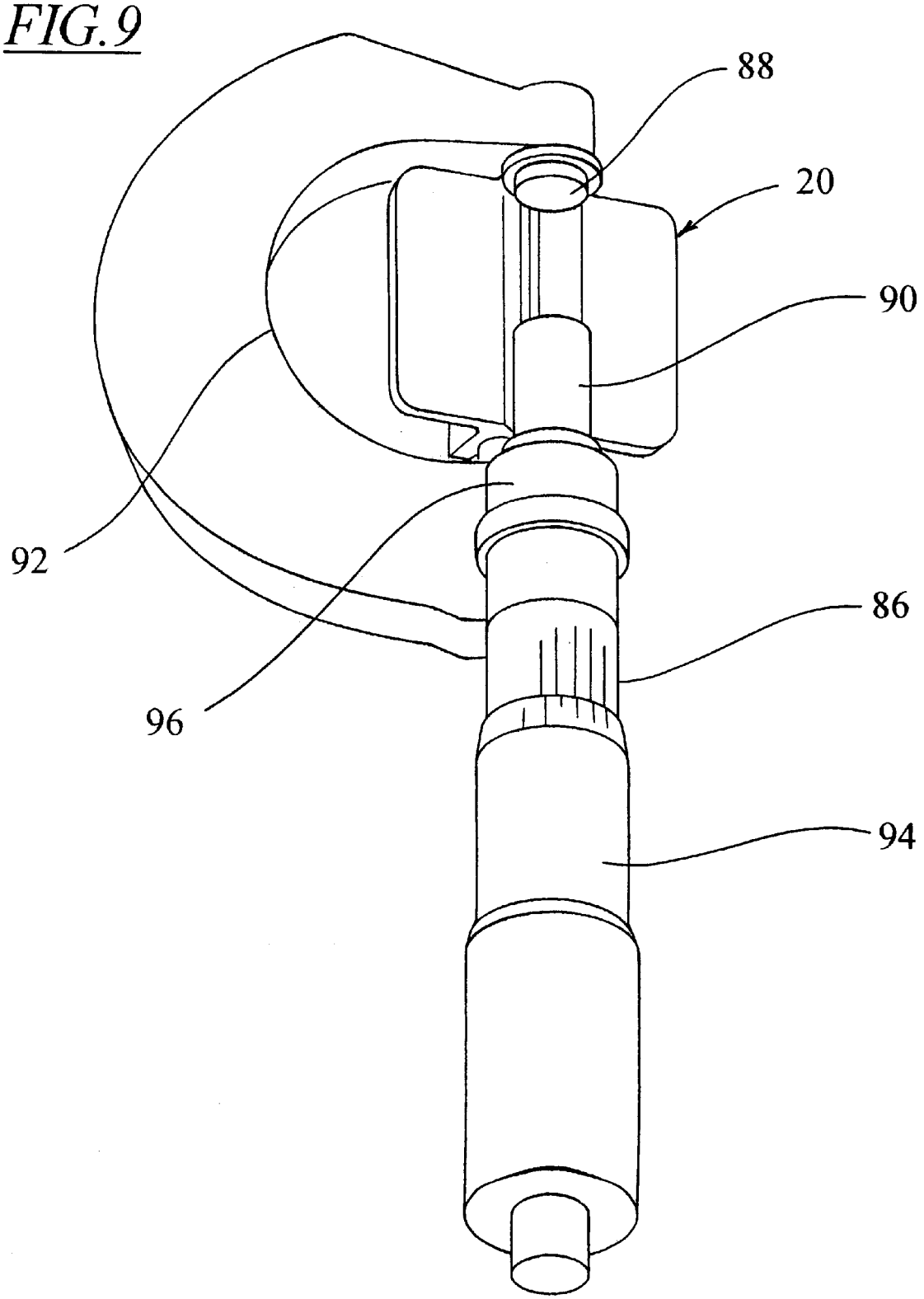
FIG. 9 is a perspective view of the preferred embodiment of the clip-on micrometer table of the present invention as installed to a conventional micrometer Reference Numerals In Drawings (Preferred Embodiment.

(Preferred Embodiment - As Installed: FIG. 9)

| | |
|---|---|
| 86 Conventional Outside Micrometer (Prior Art) | 90 micrometer spindle |
| | 94 micrometer barrel |
| 88 micrometer anvil | |
| 92 micrometer frame "throat" loop | |
| 96 micrometer body | |

DESCRIPTION

FIGS. 1–5—Preferred Embodiment

In FIGS. 1–5, the preferred embodiments of the clip-on micrometer table of the present invention are depicted. By referring to these drawings, along with the following detailed disclosure, the construction and operation of the present invention can be best understood. However, it is also to be understood that the present invention can be employed in alternate configurations not depicted herein. The following detailed disclosure as well as the associated drawings are provided for explanatory purposes and are not intended to limit the scope of the present invention.

Figure 1:
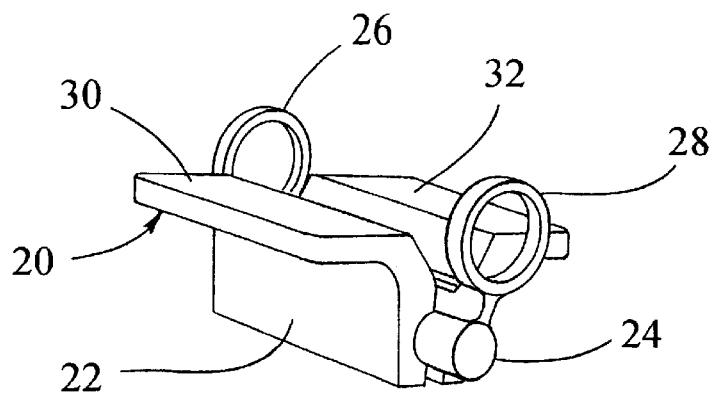
FIG. 1 is a perspective view of the preferred embodiment of the clip-on micrometer table of the present invention.
Figure 2:
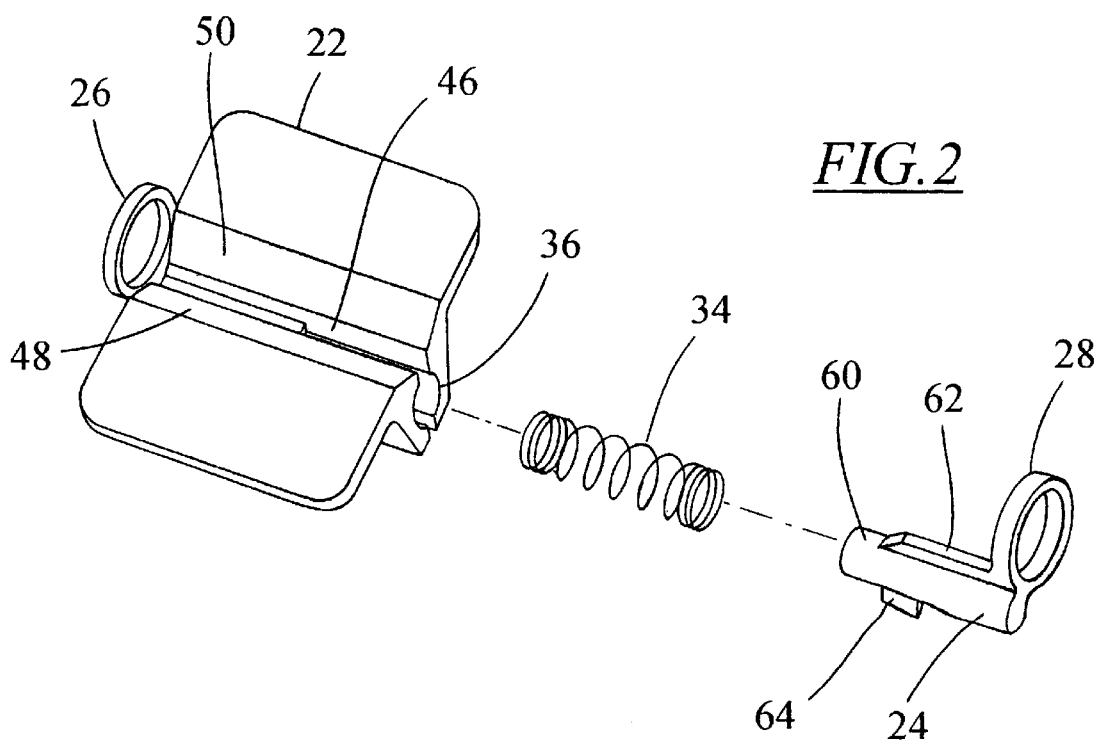
FIG. 2 is an exploded perspective view of the components of the preferred embodiment of the clip-on micrometer table of the present invention.

As shown in FIGS. 1 and 2, the preferred embodiment of the clip-on micrometer table 20 comprises a platform 22, and a cooperating spindle clip 24 which is held aligned and captive to platform 22. Platform 22 and spindle clip 24 establish a fixed parallel relationship between the axis of anvil mount ring 26 and spindle mount ring 28, (the measurement axis), and support, or table surfaces 30 and 32. Table surfaces 30 and 32 are substantially flat and in-plane with each other, comprising an area approximately 23 mm. long by 30 mm. wide. Table surfaces 30 and 32 are offset from the measurement axis approximately 0.5 mm.

Platform 22 comprises flat table surfaces 30 and 32, anvil mount ring 26, and cylindrical interface cavity 36. Anvil mount ring 26 is connected to back surface 70 of the main body of platform 22 and is contiguous with platform 22. Table surfaces 30 and 32 are parallel to the axis of both anvil mount ring 26, and interface cavity 36

Figure 3:
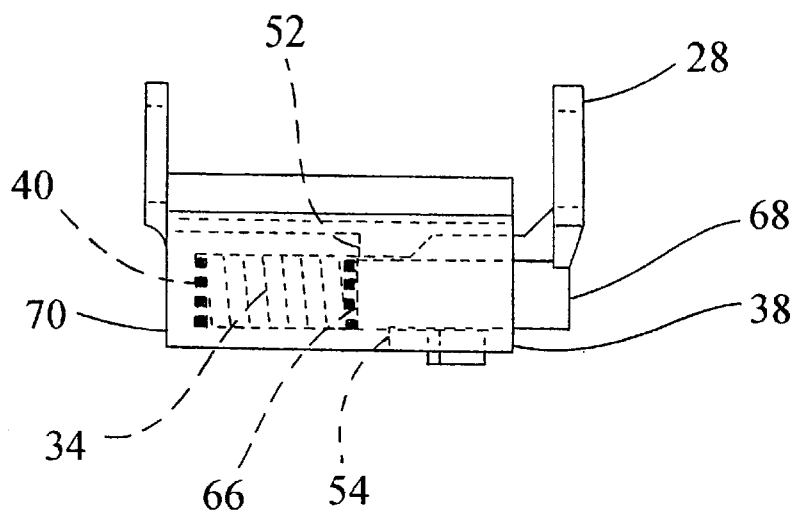
FIG. 3 is a side elevation view of the preferred embodiment of the clip-on micrometer table of the present invention.
Figure 4:
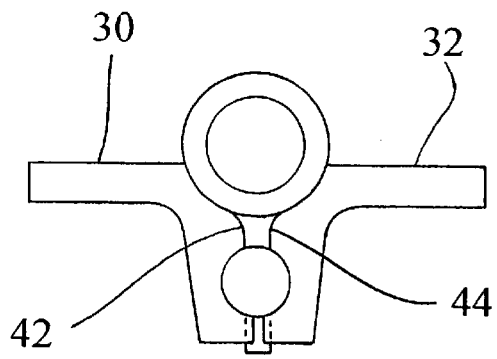
FIG. 4 is a front elevation view of the preferred embodiment of the clip-on micrometer table of the present invention.

As depicted in FIGS. 2–4, interface cavity 36 extends from platform front surface 38 to interface cavity bottom surface 40. Slot side-wall surfaces 42 and 44 form interface slot 46 which is integral with and bisected by interface cavity 36. V-channel surfaces 48 and 50 are depressed on an angle from table surfaces 30 and 32 extending to interface slot 46. Slot 46 extends from platform front surface 38 to upper slot end surface 52 above cavity 36, and from platform front surface 38 to lower slot end surface 54 below cavity 36.

Figure 5:
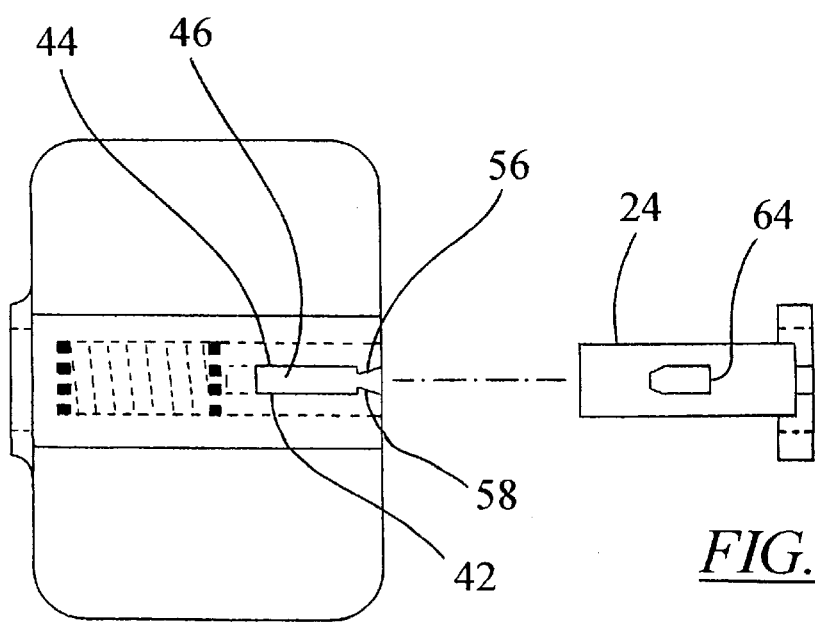
FIG. 5 is a bottom elevation view of the preferred embodiment of the clip-on micrometer table of the present invention, with the spindle clip shown removed therefrom.

As best depicted in FIG. 5, within interface slot 46 below cavity 36, are wedge-shaped snap retention features 56 and 58 which protrude from slot side-wall surfaces 42 and 44.

As shown in FIG. 2, the preferred embodiment of spindle clip 24 is comprised of rod 60 and spindle mount ring 28, connected axially parallel by web 62. Locking tab 64 protrudes from rod 60 opposite web 62. Locking tab 64, rod 60, and web 62 form a keyed (male) configuration, which is inserted into the (female) configuration described by cylindrical cavity 36 and slot 46. This keyed insertion of spindle clip 24, into platform 22 is of sufficient clearance to allow axial slip without tangential cocking. The keyed interface configuration also does not allow spindle clip 24 to rotate.

As shown in FIGS. 3 and 5, spring 34 is held captive in cavity 36 providing outward tension between interface cavity bottom surface 40 and rod end surface 66. When assembled, spindle clip 24 is held captive to platform 22 by the interface of locking tab 64, and snap retention features 56 and 58. Spindle clip 24 may be forced against outward tension supplied by spring 34, by applying pressure between rod front surface 68 and platform back surface 70. This allows compressive axial movement of spindle clip 24 in relationship to platform 22. The limit of this movement is the point of interference between platform front surface 38 and spindle mount ring 28. Before reaching the point of interference, adequate clearance is obtained to attach the present invention to a conventional micrometer. At all times, a parallel in-line relationship is maintained between the measurement axis, table surfaces 30 and 32, and V-channel surfaces 48 and 50, and cylindrical cavity 36.

FIGS. 6–12—Alternative Embodiments

There are various possibilities with regard to the construction and configuration of the present invention.

FIG. 6 depicts a configuration of the present invention incorporating a rectangular interface platform 72 and a rectangular interface spindle clip 74 to reduce the overall thickness of platform 72.

FIG. 7 depicts a spring tensioned fence 78 slidably attached to fenced platform 76. Fence 78 maintains a perpendicular attitude to the measurement axis throughout its range of movement.

FIG. 8 depicts perforated table surface 80 incorporating through holes in a grid pattern. Separate pegs 82 may be inserted into any combination of holes. Peg snap retention feature 84 retains pegs 82 to table surface 80.

FIG. 9 depicts the preferred embodiment of clip-on micrometer table 20 as attached to a conventional micrometer 86. The components of a conventional micrometer 86 discussed in this description are:

| | |
|---|---|
| 88 micrometer anvil | 90 micrometer spindle |
| 92 micrometer "throat" loop | 94 micrometer barrel |
| 96 micrometer body | |

Advantages

From the description above, a number of advantages of the clip-on micrometer table of the present invention become evident:

(a) The present invention provides a support surface on which an item to be measured is quickly and easily aligned to a micrometer's measurement axis.

(b) The present invention incorporates an axial self-aligning function to measure items which are in a fixed position.

(c) No alterations to a micrometer or measurement reading are required.

(d) Attachment to and detachment from a micrometer may be accomplished in less than five seconds.

(e) As installed, the present invention is self-retaining to a micrometer.

(f) The present invention does not affect the portability, operation, or range of measurement, of a micrometer it is attached to.

(g) The configuration of the present invention is such that high volume manufacturing by injection molding plastic may be accomplished, producing accurate components at a low per-part cost.

(h) As manufactured of molded plastic material the present invention cannot cause damage to a micrometer.

(j) The present invention may be alternately configured to reduce manufacturing cost, modify the mounting features, or modify the table configuration for better item support.

Operation—FIGS. 1–5—Preferred Embodiment

The present invention is utilized as attached to, and functioning in cooperation with a conventional micrometer 86 (FIG. 9). Attachment procedure is as follows:

Adjust micrometer spindle 90 to a position of approximately 1 to 2 mm. protrusion from micrometer body 96.

The present invention is compressed between thumb and forefinger by applying pressure between front rod surface 68 and platform back surface 70.

Anvil mounting ring 26 is positioned over micrometer anvil 88.

Spindle mounting ring 28 is aligned to, and positioned over protruding micrometer spindle 90.

Spring tension is relieved.

The present invention is now self retaining to the micrometer. Normal operation of the micrometer is unaffected. Reverse attachment procedure for removal.

The present invention as attached to a micrometer, achieves table surfaces 30 and 32 with integral V-channel surfaces 48 and 50, retained in a position parallel and coaxial to the micrometer measurement axis. As positioned flat on the table surfaces, certain items such as blade, strip, or shim stock are supported parallel to the measurement axis between the micrometers anvil and spindle measuring faces. The integral V-groove channel supports cylindrical items such as rings and die punches, and also allows clearance for spindle movement. The table surface and V-groove channel assist in supporting these various measured items in a manner whereby they do not get cocked at an angle between the anvil and spindle measuring faces. This support facilitates rapid alignment and measurement accuracy throughout the entire measurement range of the micrometer.

The present invention is attached to the micrometer by cylindrical capture. Anvil mount ring 26 slip-fits over the cylindrical micrometer anvil 88, and spindle mount ring 28 slip-fits over the cylindrical micrometer spindle 90. This allows the present invention to rotate around the measurement axis. Throughout rotation, the table surface and V-groove channel are maintained parallel and coaxial to the measurement axis. This rotation enables the present invention to be axially self-aligning to items which are in a fixed position, such as a blade which is installed in a cutting machine. When pressed against these fixed items, the table surface of the present invention will rotate axially so as to align itself flat against them. While against the table surface, the fixed item may be more accurately measured.

The table surface is offset from the measurement axis by approximately 0.5 mm. This offset has been found to counteract the tendency of an item to walk across the table while being measured, due to contact with the rotating spindle face.

The compact construction of the present invention allows sufficient clearance to the micrometer "throat" 92 for normal one-handed measurement taking, as previously described.

Operation—FIGS. 6–12—Alternate Embodiments

As shown in FIG. 6, the interface of rectangular interface platform 72 and rectangular interface spindle clip 74, reduces the thickness of the present invention. This compact embodiment increases grasping clearance to the micrometer throat 92. The method of operation is the same as with the preferred embodiment.

FIG. 7 illustrates fenced platform 76 incorporating slidably installed spring tensioned fence 78. As the measured item is positioned flat on the surface of fenced platform 76, it is forced against spring tension exerted by fence 78. Fence 78 is then allowed to pre-load the measured item against the micrometer anvil 88. Pre-loading helps to secure the item for ease of measurement taking.

FIG. 8 depicts perforated table surface 80, configured with a grid pattern of through holes. Independent pegs 82 may be snapped into or removed from the holes by elastic deformation of peg snap-retention feature 84. As installed, pegs 82 serve to consistently align similarly configured items in the same location relative to the micrometer measuring faces. Thereby, a certain aspect or profile is measured consistently item to item. Pegs 82 may be arranged on the table surface in any combination of locations to accommodate item profiles.

Conclusion, Ramifications, and Scope

As is apparent from the entire foregoing discussion, the clip-on micrometer table of the present invention may be used to quickly position an item parallel to the measurement axis of a micrometer, whereby an accurate measurement may be taken throughout the entire measurement range. Many items with shapes that are difficult to align for measurement, are easily supported in the optimum position for accurate measurement. In addition, the axial self-aligning feature acts to align the micrometer to non-movable items. Furthermore, the clip-on micrometer table of the present invention has additional advantages in that:

it can be attached to and detached from a conventional micrometer in less than five seconds, and is self-retaining when attached.

it does not affect the measurement range, the measurement reading, the portability, or the normal operation of a micrometer.

it may be configured in a variety of alternate table profiles to accommodate different item shapes.

it may be configured with alternate mechanisms to reduce its overall size, increasing micrometer grasping clearance.

it may incorporate table features which pre-load and hold the item in position for measurement.

it may incorporate table features which consistently align similarly shaped items for accurate comparative measurement.

it is configured to allow high volume manufacturing by injection molding plastic.

it will not cause damage to a micrometer due to its manufacturing from softer material.

Although the description above contains many specific details, these should not be construed as limiting the scope of the present invention but as merely providing illustrations of some of the presently preferred embodiments of this invention. For example, the size may be changed for use with larger or alternately configured micrometers, etc.; or it may be textured or rubber coated to reduce possible slipping of an item on the table surface, etc.

Having described my invention, what I claim as new and desire to secure by Letters Patent is:

1. A tool for aligning items between the measuring faces of a common micrometer, comprising:
   (a) a platform body incorporating an alignment surface, said alignment surface capable of supporting a workpiece within the entire measurement range of said micrometer.
   (b) a first cylindrical ring connected perpendicular to and at one end of said alignment surface.
   (c) a second cylindrical ring slidably connected to said platform body, maintained coaxial to said first cylindrical ring with a limited range of axial travel extending beyond said platform body, and spring tensioned in the direction of extension.

2. The tool of claim 1 wherein said tensioning spring is positioned on a separate axis from said first and second cylindrical rings.

3. The tool of claim 1 wherein said platform body incorporates a hollow cylinder, and wherein said second cylindrical ring is permanently attached to a solid cylinder, said solid cylinder being slidably engaged within said hollow cylinder, wherein said tensioning spring is held captive in said hollow cylinder.

4. An aligning means, providing:
   (a) a platform body incorporating an alignment surface which is maintained parallel to the measurement axis of a common micrometer, said alignment surface being capable of supporting workpieces within the entire measurement range of said micrometer.
   (b) an attaching means, providing cylindrical capture of said micrometer spindle and said micrometer anvil.
   (c) a tensioning means provided by a spring, exerting extending force between said attaching means.

5. The tool of claim 4 wherein said tensioning means is positioned on a separate axis from said measurement axis.

6. The tool of claim 4 wherein said tensioning means is held captive within said platform body.

* * * * *